(12) United States Patent
Sasaki et al.

(10) Patent No.: US 8,883,041 B2
(45) Date of Patent: Nov. 11, 2014

(54) METHOD FOR PREPARING PHOSPHOR

(71) Applicant: Koito Manufacturing Co., Ltd., Tokyo (JP)

(72) Inventors: Yasutaka Sasaki, Shizuoka (JP); Hisayoshi Daicho, Shizuoka (JP); Takeshi Iwasaki, Shizuoka (JP)

(73) Assignee: Koito Manufacturing Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 13/961,615

(22) Filed: Aug. 7, 2013

(65) Prior Publication Data

US 2013/0320261 A1 Dec. 5, 2013

Related U.S. Application Data

(63) Continuation of application No. PCT/JP2012/000959, filed on Feb. 14, 2012.

(30) Foreign Application Priority Data

Feb. 14, 2011 (JP) ................. 2011-028994

(51) Int. Cl.
 *C09K 11/73* (2006.01)
 *C09K 11/61* (2006.01)
 *C09K 11/77* (2006.01)
(52) U.S. Cl.
 CPC ................. *C09K 11/7734* (2013.01)
 USPC ........ 252/301.4 F; 252/301.4 H; 252/301.6 F
(58) Field of Classification Search
 USPC .......................... 252/301.4 F, 301.6 F, 301.4 H
 See application file for complete search history.

(56) References Cited

U.S. PATENT DOCUMENTS

| 6,899,825 | B2 * | 5/2005 | Matsuda et al. | ........ 252/301.4 F |
| 7,276,183 | B2 * | 10/2007 | Tian | ........ 252/301.4 F |
| 7,704,411 | B2 * | 4/2010 | Daicho et al. | ........ 252/301.4 R |
| 2008/0253951 | A1 * | 10/2008 | Daicho et al. | ........ 423/263 |
| 2009/0230839 | A1 * | 9/2009 | Nakamura et al. | ........ 313/503 |
| 2011/0025193 | A1 * | 2/2011 | Daicho et al. | ........ 313/503 |
| 2012/0187338 | A1 * | 7/2012 | Kim et al. | ........ 252/301.4 H |

FOREIGN PATENT DOCUMENTS

| CN | 101379164 A | 3/2009 |
| EP | 2280054 A2 | 2/2011 |
| JP | 56-155280 | * 12/1981 |
| JP | 2007145958 A | 6/2007 |
| JP | 2007217605 A | 8/2007 |
| JP | 2008274240 A | 11/2008 |
| JP | 2009038348 A | 2/2009 |
| JP | 2011021062 A | 3/2011 |
| WO | 2006/022793 A2 | 3/2006 |
| WO | WO 2011/040709 | * 4/2011 |

OTHER PUBLICATIONS

International Search Report for corresponding International Appln. No. PCT/JP2012/000959 dated May 22, 2012, with English translation (8 pages).
International Preliminary Report on Patentability with Written Opinion of the International Search Authority for corresponding International Appln. No. PCT/JP2012/000959 dated May 22, 2012, with English translation (11 pages).
Office Action issued on April , by the Chinese Patent Office in corresponding Chinese Patent Application No. 201280008901.4, and an English Translation of the Office Action. (15 pages).

* cited by examiner

*Primary Examiner* — Carol M Koslow
(74) *Attorney, Agent, or Firm* — Buchanan Ingersoll & Rooney PC

(57) ABSTRACT

A method for preparing a phosphor that comprises a crystalline oxide having $M^1O_3$ ($M^1$ is a tetravalent metallic element) as a main framework thereof and essentially including a halogen element X (X is at least one element selected from a group consisting of F, Cl, Br, and I) and divalent metal ions $M^2$ and $Eu^{2+}$, includes using a compound represented by a compositional formula $NH_4X$ as a starting material when synthesizing the phosphor. At least a compound represented by a compositional formula $NH_4Cl$ may be used as the starting material.

1 Claim, 11 Drawing Sheets

METHOD FOR PREPARING PHOSPHOR

CROSS-REFERENCE TO RELATED APPLICATIONS

This application is based upon and claims the benefit of priority from the prior Japanese Patent Application No. 2011-028994, filed on Feb. 14, 2011, and International Patent Application No. PCT/JP2012/000959, filed on Feb. 14, 2012, the entire content of each of which is incorporated herein by reference.

BACKGROUND OF THE INVENTION

1. Field of the Invention

The invention relates to a phosphor (fluorescent substance) that is efficiently excited by ultraviolet rays or in a short-wavelength region to emit light.

2. Description of the Related Art

A variety of light-emitting devices are known, which are configured to produce light of the desired color by using a combination of a light-emitting element and a phosphor that is excited by light emitted from the light-emitting element so as to produce light in a wavelength region different from that of the light-emitting element.

In recent years, white light-emitting device modules with long life and low power consumption have drawn attention, which are configured to produce white light by using a combination of a semiconductor light-emitting element such as a light-emitting diode (LED) or a laser diode (LD) that emits ultraviolet light or short-wavelength visible light and a phosphor that uses the light-emitting element as an excitation light source.

Known examples of such white light-emitting modules include systems using a combination of an LED that emits ultraviolet rays or short-wavelength visible light and different phosphors that are excited by ultraviolet rays or short-wavelength visible light to emit light beams of colors such as blue and yellow, respectively.

A yellow phosphor described in JP 2009-38348 includes a halogen element. Therefore, a metal halide such as $SrCl_2$, $CaCl_2$, or the like is used as a source of a halogen element for a material used for the preparation of a phosphor.

However, $SrCl_2$ and $CaCl_2$ are high in absorbency and require careful attention when $SrCl_2$ and $CaCl_2$ are treated in the atmosphere. In other words, if $SrCl_2$ or $CaCl_2$ is mixed with another material as a raw material of a phosphor in the atmosphere, the amount of moisture content may greatly change depending on the humidity, and the composition of the phosphor that is prepared may not be stable. As a result, it is necessary to devise equipment or steps in order to maintain the properties of the phosphor.

SUMMARY OF THE INVENTION

In this background, a purpose of the present invention is to provide a technology for preparing a phosphor that has properties in a desired range, in a stable manner.

A method for preparing a phosphor according to one embodiment of the present invention is a method for preparing a phosphor that comprises a crystalline oxide having $M^1O_3$ ($M^1$ is a tetravalent metallic element) as a main framework thereof and essentially including a halogen element X (X is at least one element selected from a group consisting of F, Cl, Br, and I) and divalent metal ions $M^2$ and $Eu^{2+}$. A compound represented by a compositional formula $NH_4X$ is used as a starting material(s) when synthesizing the phosphor.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
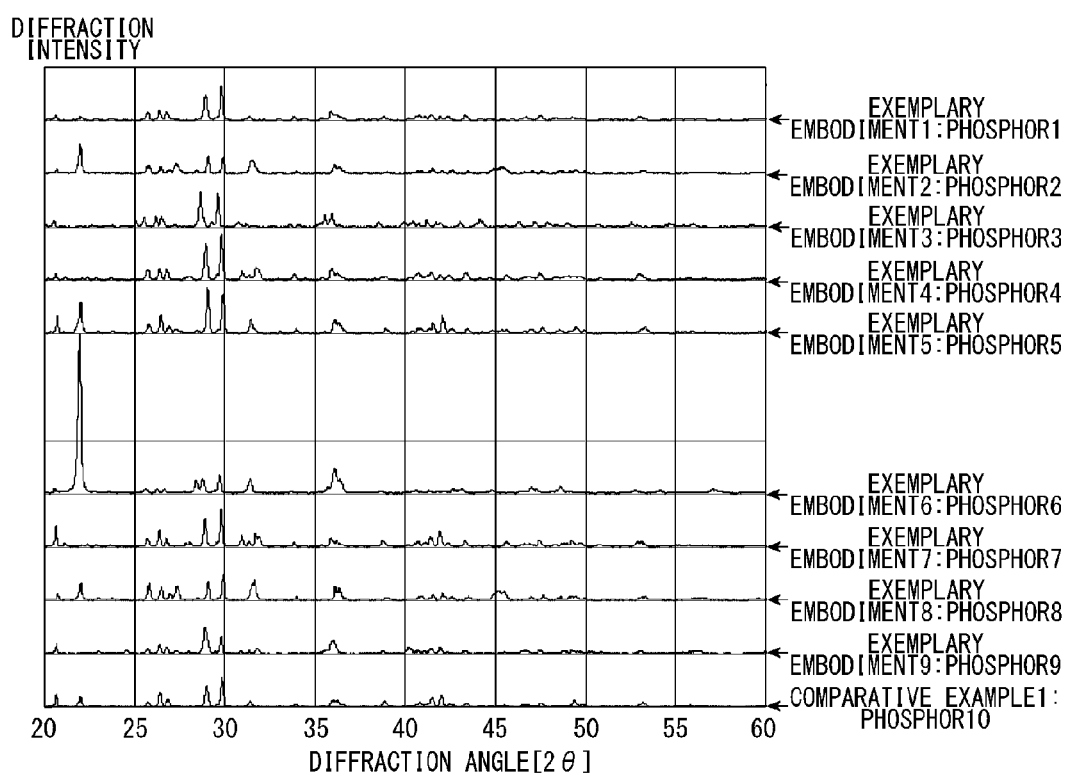
FIG. 1 is a diagram illustrating results of X-ray diffraction measurement using a Cu Kα characteristic X-ray with respect to phosphors 1 to 9 (exemplary embodiments 1 to 9) according to the present exemplary embodiments and a phosphor 10 (comparative example 1) according to the present comparative example.

A method for preparing a phosphor according to one embodiment of the present invention is a method for preparing a phosphor that comprises a crystalline oxide having $M^1O_3$ ($M^1$ is a tetravalent metallic element) as a main framework thereof and essentially including a halogen element X (X is at least one element selected from a group consisting of F, Cl, Br, and I) and divalent metal ions $M^2$ and $Eu^{2+}$. A compound represented by a compositional formula $NH_4X$ is used as a starting material(s) when synthesizing the phosphor.

The deliquescency of a compound represented by a compositional formula $NH_4X$ (X is at least one element selected from a group consisting of F, Cl, Br, and I) is not generally high. Therefore, according to this aspect, in the preparation of a phosphor that comprises a crystalline oxide having $M^1O_3$ as a main framework thereof and essentially including a halogen element X and divalent metal ions $M^2$ and $Eu^{2+}$, the preparation of the phosphor can be possible in a wide range of environments by using a compound represented by a compositional formula $NH_4X$ as a feed material of a halogen element X contained in the phosphor. In other words, a phosphor having properties in a desired range can be prepared without using equipment or a step that takes into account the deliquescency, that is, humidity or can be prepared by simplifying the equipment or the step.

The general formula of the phosphor may be represented by $(M^2_x, M^3_y, M^4_z)_a M^1 O_3 X_b$, where $M^1$ represents at least one element including at least Si and selected from a group consisting of Si, Ge, Ti, Zr, and Sn, where $M^2$ represents at least one element including at least Ca and selected from a group consisting of Ca, Mg, Zn, Cd, Ni, Cu, Hg, Co, and Sn, where $M^3$ represents at least one element including at least Sr and selected from a group consisting of Sr, Ba, and Pb, where X represents at least one halogen element including at least Cl, where $M^4$ represents at least one element including at least $Eu^{2+}$ and selected from a group consisting of rare-earth elements and Mn, where a is in a range of $0.1 \leq a \leq 1.4$, and b is in a range of $0.1 \leq b \leq 0.5$, and where x, y, and z are in respective ranges that satisfy $x+y+z=1$, $0<x<1$, $0<y<1$, and $0.01 \leq z \leq 0.5$. This allows for the preparation of a phosphor that has stable properties even when starting materials are mixed in the atmosphere.

Also, a may be in a range of $0.8 \leq a \leq 1.3$, and b may be in a range of $0.25 \leq b \leq 0.45$. Also, x, y, and z may be in respective ranges that satisfy $x+y+z=1$, $0.18 \leq x \leq 0.59$, $0.26 \leq y \leq 0.66$, and $0.07 \leq z \leq 0.37$.

Compounds represented by the following compositional formulae (1) to (5), respectively, may be used as starting materials
(1) $M^2O_2$
(2) $M^2O$
(3) $M^3O$
(4) $NH_4X$
(5) $M^4$ where $M^1$ represents at least one element including at least Si and selected from a group consisting of Si, Ge, Ti, Zr, and Sn, where $M^2$ represents at least one element including at least Ca and selected from a group consisting of Ca, Mg, Zn, Cd, Ni, Cu, Hg, Co, and Sn, where $M^3$ represents at least one element including at least Sr and selected from a group consisting of Sr, Ba, and Pb, where X represents at least one halogen element including at least Cl, where $M^4$ represents at least one element including at least $Eu^{2+}$ and selected from a group consisting of rare-earth elements and Mn.

Another aspect of the present invention relates to a method for preparing a phosphor. In the method for preparing a phosphor, compounds represented by the following compositional formulae (1) to (5), respectively, may be used as starting materials
(1) $M^2O_2$
(2) $M^2O$
(3) $M^3O$
(4) $NH_4X$
(5) $M^4$ where $M^1$ represents at least one element selected from a group consisting of Si, Ge, Ti, Zr, and Sn, where $M^2$ represents at least one element including at least Ca and selected from a group consisting of Ca, Mg, Ba, Zn, Cd, Ni, Cu, Hg, Co, and Sn, where $M^3$ represents at least one element including at least Sr and selected from a group consisting of Sr, Mg, Ba, Zn, Cd, Ni, Cu, Hg, Co, Sn, and Pb, where X represents at least one halogen element, where $M^4$ represents at least one element including at least $Eu^{2+}$ and selected from a group consisting of rare-earth elements and Mn, and where, when $A=M^2O/(M^2O+M^3O+M^4)$ $B=M^4/(M^2O+M^3O+M^4)$, $C=NH_4X/(M^2O+M^3O+M^4)$, and $D=M^1O_2/(M^2O+M^3O+M^4)$, the compounds may be blended such that ranges $0.19 \leq A \leq 0.59$, $0.07 \leq B \leq 0.37$, $0.29 \leq C \leq 1.11$, and $0.05 \leq D \leq 4.35$ are satisfied, and the starting materials may be mixed and burned.

Optional combinations of the aforementioned constituting elements, and implementations of the invention in the form of methods, apparatuses, and systems may also be practiced as additional modes of the present invention.

According to the present invention, a phosphor having properties in a desired range can be prepared in a stable manner.

Hereinafter, an example embodiment for carrying out the present invention will be described in detail with reference to the accompanying drawing. In the explanation of the figures, like numerals represent like constituting elements, and duplicative explanations will be omitted appropriately.

A phosphor according to the present embodiment comprises a crystalline oxide having $M^1O_3$ ($M^1$ is a tetravalent metallic element) as a main framework thereof and essentially including a halogen element X (X is at least one element selected from a group consisting of F, Cl, Br, and I) and divalent metal ions $M^2$ and $Eu^{2+}$.

More specifically, the phosphor is a phosphor that is excited by ultraviolet or short-wavelength visible light to emit visible light in a yellow wavelength range and is expressed by a general formula $(M^2_x, M^3_y, M^4_z)_a M^1O_3X_b$, wherein $M^1$ represents at least one element including at least Si and selected from a group consisting of Si, Ge, Ti, Zr, and Sn, wherein $M^2$ represents at least one element including at least Ca and selected from a group consisting of Ca, Mg, Ba, Zn, Cd, Ni, Cu, Hg, Co, Sn, and Pb, wherein $M^3$ represents at least one element including at least Sr and selected from a group consisting of Sr, Mg, Ba, Zn, Cd, Ni, Cu, Hg, Co, Sn, and Pb, wherein X represents at least one halogen element including at least Cl, wherein $M^4$ represents at least one element including at least $Eu^{2+}$ and selected from a group consisting of rare-earth elements and Mn, wherein a is in a range of $0.1 \leq a \leq 1.4$, wherein b is in a range of $0.1 \leq b \leq 0.5$, and wherein x, y, and z are in respective ranges that satisfy $x+y+z=1$, $0 \leq x \leq 1$, $0 \leq y \leq 1$, and $0.01 \leq z \leq 0.4$.

The phosphor according to the present embodiment, which is expressed by the above-stated general formula, can be obtained as described below. The phosphor can be produced using compounds represented by the following compositional formulae (1) to (5), respectively, as starting materials.

(1) $M^1O_2$ (wherein $M^1$ represents a tetravalent element such as Si, Ge, Ti, Zr, Sn, or the like)

(2) $M^2O$ (wherein $M^2O$ represents a compound including $M^2$ and O, $M^2$ represents a divalent element such as Ca, Mg, Ba, Zn, Cd, Ni, Cu, Hg, Co, Sn, Pb, or the like)

(3) $M^3O$ (wherein $M^3O$ represents a compound including $M^3$ and O, $M^3$ represents a divalent element such as Sr, Mg, Ba, Zn, Cd, Ni, Cu, Hg, Co, Sn, Pb, or the like)

(4) $NH_4X$ (wherein X represents a halogen element such as F, Cl, Br, I, or the like)

(5) $M^4$ or a compound including $M^4$ (wherein $M^4$ represents a rare-earth element such as $Eu^{2+}$ and/or Mn).

For example, $SiO_2$, $GeO_2$, $TiO_2$, $ZrO_2$, $SnO_2$, or the like can be used as a raw material of the compositional formula (1). For example, a metallic compound including an oxygen such as a carbonate, an oxide, a hydroxide, or the like of a divalent metal ion can be used as respective raw materials of the compositional formulae (2) and (3). For example, $NH_4F$, $NH_4Cl$, $NH_4Br$, $NH_4I$, or the like can be used as a raw material of the compositional formula (4). For example, $Eu_2O_3$, $Eu_2(CO_3)_3$, $Eu(OH)_3$, $EuCl_3$, MnO, $Mn(OH)_2$, $MnCO_3$, $MnCl_2 \cdot 4H_2O$, $Mn(NO_3)_2 \cdot 6H_2O$, or the like can be used as a raw material of compositional formula (5).

In the raw material of compositional formula (1), $M^1$ preferably includes at least Si. Si may also be partially substituted with at least one element selected from a group consisting of Ge, Ti, Zr, and Sn. In this case, the compound is preferably such that the content of Si in $M^1$ is 80 mol % or more. In the raw material of the compositional formula (2), $M^2$ preferably includes at least Ca. Ca may also be partially substituted with at least one element selected from a group consisting of Mg, Ba, Zn, Cd, Ni, Cu, Hg, Co, Sn, and Pb. In this case, the compound is preferably such that the content of Ca in $M^2$ is 60 mol % or more. In the raw material of the compositional formula (3), $M^3$ preferably includes at least Sr. Sr may also be partially substituted with at least one element selected from a group consisting of Mg, Ba, Zn, Cd, Ni, Cu, Hg, Co, Sn, and Pb. In this case, the compound is preferably such that the content of Sr in $M^3$ is 60 mol % or more. In the raw material of the compositional formula (4), X preferably includes at least Cl. Cl may also be partially substituted with another halogen element. In this case, the compound is preferably such that the content of Cl is 50 mol % or more. In the raw material of the compositional formula (5), $M^4$ is preferably a rare-earth element essentially including divalent Eu, and $M^4$ may also include Mn or a rare-earth element other than Eu.

Preferably, the raw materials of the compositional formulae (1) to (5) are each weighed in molar ratios of $0.19 \leq A \leq 0.59$, $0.07 \leq B \leq 0.37$, $0.29 \leq C \leq 1.11$, and $0.05 \leq D \leq 4.35$, and the weighed materials are each placed in an alumina mortar and ground and mixed for about 30 minutes so as to obtain a raw material mixture. The raw materials of the compositional formulae (1) to (5) may be each weighed in predetermined molar ratios, and the weighed materials may be each placed in an alumina mortar and ground and mixed for about 30 minutes so as to obtain a raw material mixture. The raw material mixture is placed in an alumina crucible and burned in a reducing-atmosphere electric furnace under a predetermined atmosphere ($H_2N_2=5\ 95$) at a temperature of from 700° C. to less than 1100° C. for 3 to 40 hours so that a burned product is obtained. A phosphor can be obtained by washing the burned product thoroughly with warm pure water and then by washing off excess chloride.

The phosphor according to the present embodiment emits visible light when excited by ultraviolet light or short-wavelength visible light. The phosphor according to the present embodiment can be used as a various types of light-emitting module by combining the phosphor with an excitation light source. As the excitation light source, for example, a semiconductor light-emitting element such as an LED, an LD, etc., a light source for obtaining light emission from vacuum discharge or thermoluminescence, an electron beam excited light-emitting element, or the like can be used.

In particular, the phosphor according to the present embodiment has a crystalline structure of the same type as that of a phosphor described in Japanese Patent Application (Laid-Open) No. 2008-274240 and is efficiently excited in a wavelength range around 400 nm to emit visible light with high emission intensity. Thus, the phosphor is preferably combined with an excitation light source that emits light in a wavelength range around 400 nm.

In combining these excitation light sources and the phosphor according to the present embodiment, the excitation light sources and the phosphor can be fixed by dispersing powders of the phosphor in a transparent resin (silicone, fluorine, sol-gel silica, etc.) having good light resistance and then by applying the transparent resin, in which the powders are dispersed, over the respective excitation light sources such as LED, and hardening the transparent resin. At this time, from the aspect of the dispersibility and applicability to the transparent resin, the average particle diameter of the powders of the phosphor is preferably in a range of 0.1 to 20 μm.

The light-emitting module can be possibly used for, for example, an LED, an LD, a fluorescent light, a vacuum fluorescent display (VFD), a field emission display (FED), a plasma display panel (PDP), a cold cathode fluorescent lamp (CCFL), and the like. In particular, the phosphor according to the present embodiment is excellent in emitting yellow light and is capable of forming a white light-emitting module when combined with another phosphor and/or another light source followed by additive color mixing. For example, by using an LED or an LD that emits ultraviolet light or short-wavelength visible light as an excitation light source and by combining the LED or LD with the phosphor according to the present embodiment and another phosphor in a blue region, a white light-emitting module can be formed.

EXEMPLARY EMBODIMENT

The above phosphor is more specifically described below using exemplary embodiments. It will be understood that the raw materials for the phosphor, the production method, the chemical composition of the phosphor, and other features described below are not intended to limit the configuration of the phosphor according to the present embodiment. In the following phosphors 1 to 9 and 12 to 19, a compound represented by a compositional formula $NH_4X$, more specifically, mainly $NH_4Cl$ is used as a starting material when synthesizing the respective phosphors. The composition ratio of each phosphor and the molar ratio of a raw material are shown in Table 1.

TABLE 1

|  | $SiO_2$ $M^1$ | $NH_4Cl$ | $NH_4Br$ ($NH_4X$) | $NH_4I$ | $SrCl_2$ | $SrCO_3$ $M^3O$ | $CaCO_3$ $M^2O$ | $Ca(OH)_2$ $M^2O$ | $Eu_2O_3$ $M^4$ |
|---|---|---|---|---|---|---|---|---|---|
| EXEMPLARY EMBODIMENT 1: PHOSPHOR 1 | 1.00 | 0.63 | 0 | 0 | 0 | 0.50 | 0 | 0.46 | 0.08 |
| EXEMPLARY EMBODIMENT 2: PHOSPHOR 2 | 1.00 | 0.39 | 0 | 0 | 0 | 0.18 | 0 | 0.42 | 0.05 |
| EXEMPLARY EMBODIMENT 3: PHOSPHOR 3 | 1.00 | 0.61 | 0.01 | 0.01 | 0 | 0.75 | 0.21 | 0 | 0.08 |
| EXEMPLARY EMBODIMENT 4: PHOSPHOR 4 | 1.00 | 0.33 | 0 | 0 | 0 | 0.50 | 0 | 0.46 | 0.08 |
| EXEMPLARY EMBODIMENT 5: PHOSPHOR 5 | 1.00 | 1.25 | 0 | 0 | 0 | 0.50 | 0 | 0.46 | 0.08 |
| EXEMPLARY EMBODIMENT 6: PHOSPHOR 6 | 1.00 | 0.15 | 0 | 0 | 0 | 0.12 | 0 | 0.07 | 0.02 |
| EXEMPLARY EMBODIMENT 7: PHOSPHOR 7 | 1.00 | 1.00 | 0 | 0 | 0 | 0.80 | 0 | 0.47 | 0.13 |
| EXEMPLARY EMBODIMENT 8: PHOSPHOR 8 | 1.00 | 0.58 | 0 | 0 | 0 | 0.38 | 0 | 0.58 | 0.04 |
| EXEMPLARY EMBODIMENT 9: PHOSPHOR 9 | 1.00 | 0.58 | 0 | 0 | 0 | 0.31 | 0 | 0.35 | 0.19 |

TABLE 1-continued

| | SiO$_2$ M$^1$ | NH$_4$Cl | NH$_4$Br (NH$_4$X) | NH$_4$I | SrCl$_2$ | SrCO$_3$ M$^3$O | CaCO$_3$ M$^2$O | Ca(OH)$_2$ M$^2$O | Eu$_2$O$_3$ M$^4$ |
|---|---|---|---|---|---|---|---|---|---|
| COMPARATIVE EXAMPLE 1: PHOSPHOR 10 | 1.00 | 0 | 0 | 0 | 0.50 | 0 | 0 | 0.46 | 0.08 |
| COMPARATIVE EXAMPLE 2: PHOSPHOR 11 | 1.00 | 0 | 0 | 0 | 0.42 | 0 | 0 | 0.46 | 0.13 |
| COMPARATIVE EXAMPLE 3: PHOSPHOR 12 | 1.00 | 0.39 | 0 | 0 | 0 | 0.16 | 0.45 | 0 | 0.05 |
| COMPARATIVE EXAMPLE 4: PHOSPHOR 13 | 1.00 | 0.63 | 0 | 0 | 0 | 0.96 | 0 | 0 | 0.08 |
| COMPARATIVE EXAMPLE 5: PHOSPHOR 14 | 1.00 | 0.21 | 0 | 0 | 0 | 0.50 | 0.46 | 0 | 0.08 |
| COMPARATIVE EXAMPLE 6: PHOSPHOR 15 | 1.00 | 1.46 | 0 | 0 | 0 | 0.50 | 0.46 | 0 | 0.08 |
| COMPARATIVE EXAMPLE 7: PHOSPHOR 16 | 1.00 | 0.10 | 0 | 0 | 0 | 0.08 | 0 | 0.05 | 0.01 |
| COMPARATIVE EXAMPLE 8: PHOSPHOR 17 | 1.00 | 1.15 | 0 | 0 | 0 | 0.92 | 0 | 0.54 | 0.15 |
| COMPARATIVE EXAMPLE 9: PHOSPHOR 18 | 1.00 | 0.58 | 0 | 0 | 0 | 0.38 | 0 | 0.62 | 0.02 |
| COMPARATIVE EXAMPLE 10: PHOSPHOR 19 | 1.00 | 0.58 | 0 | 0 | 0 | 0.27 | 0 | 0.31 | 0.23 |

<Phosphor 1>

Phosphor 1 is a phosphor represented by $(Ca_{0.41},Sr_{0.44},Eu_{0.15})_{7/6}SiO_3Cl_{2/6}$. Phosphor 1 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. The respective contents x, y, and z of $M^2$, $M^3$, and $M^4$ are shown in Table 1. With regard to phosphor 1, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The raw material mixture was placed in an alumina crucible and burned under a predetermined reducing atmosphere (H$_2$N$_2$=5 95) at a temperature of 1030° C. for 5 to 40 hours in an electric furnace so that a burned product was obtained. The resulting burned product was thoroughly washed with warm pure water so that phosphor 1 was obtained.

<Phosphor 2>

Phosphor 2 is a phosphor represented by $(Ca_{0.59},Sr_{0.26},Eu_{0.15})_{7/6}SiO_3Cl_{2/6}$. Phosphor 2 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. The respective contents x, y, and z of $M^2$, $M^3$, and $M^4$ are shown in Table 1. With regard to phosphor 2, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 2.

<Phosphor 3>

Phosphor 3 is a phosphor represented by $(Ca_{0.18},Sr_{0.66},Eu_{0.16})_{7/6}SiO_3Cl_{0.31}Br_{0.01}I_{0.01}$. Phosphor 3 is represented by the general formula $(M^2_x,M^3_y,M^4_z)_a M^1O_3X_b$, wherein $M^1$=Si, $M^2$=Ca, $M^3$=Sr, X=Cl, Br, or I, $M^4$=Eu$^{2+}$, a=7/6, and b=2/6. With regard to phosphor 3, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. Phosphor 3 is a phosphor with an extremely large volume of SiO$_2$. The same method as the method used for phosphor 1 was then used to obtain phosphor 3.

<Phosphor 4>

Phosphor 4 is a phosphor represented by $(Ca_{0.40},Sr_{0.45},Eu_{0.15})_{7/6}SiO_3Cl_{2/6}$. Phosphor 4 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. The respective contents x, y, and z of $M^2$, $M^3$, and $M^4$ are shown in Table 1. With regard to phosphor 4, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 4.

<Phosphor 5>

Phosphor 5 is a phosphor represented by $(Ca_{0.42},Sr_{0.43},Eu_{0.15})_{7/6}SiO_3Cl_{2/6}$. Phosphor 5 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. The respective contents x, y, and z of $M^2$, $M^3$, and $M^4$ are shown in Table 1. With regard to phosphor 5, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 5.

<Phosphor 6>

Phosphor 6 is a phosphor represented by $(Ca_{0.31},Sr_{0.52},Eu_{0.17})_{7/6}SiO_3Cl_{2/6}$. Phosphor 6 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 6, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. Phosphor 6 is a phosphor with an extremely large volume of SiO$_2$. The same method as the method used for phosphor 1 was then used to obtain phosphor 6.

<Phosphor 7>

Phosphor 7 is a phosphor represented by $(Ca_{0.31},Sr_{0.52},Eu_{0.17})_{7/6}SiO_3Cl_{2/6}$. Phosphor 7 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 7, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. Phosphor 7 is a phosphor with an extremely small volume of $SiO_2$. The same method as the method used for phosphor 1 was then used to obtain phosphor 7.

<Phosphor 8>

Phosphor 8 is a phosphor represented by $(Ca_{0.56},Sr_{0.37},Eu_{0.07})_{7/6}SiO_3Cl_{2/6}$. Phosphor 8 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 8, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 8.

<Phosphor 9>

Phosphor 9 is a phosphor represented by $(Ca_{0.33},Sr_{0.30},Eu_{0.37})_{7/6}SiO_3Cl_{2/6}$. Phosphor 9 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 9, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 9.

In the general formula $(M^2_x,M^3_y,M^4_z)_a M^1O_3X_b$ of the phosphor according to the present embodiment, a may be in a range of $0.8 \leq a \leq 1.3$, and b may be in a range of $0.25 \leq b \leq 0.45$. Also, x, y, and z may be in respective ranges that satisfy x+y+z=1, $0.18 \leq x \leq 0.59$, $0.26 \leq y \leq 0.66$, and $0.07 \leq z \leq 0.37$.

Comparative Examples

<Phosphor 10>

Phosphor 10 is a phosphor represented by $(Ca_{0.54},Sr_{0.37},Eu_{0.09})_{7/6}SiO_3Cl_{2/6}$. Phosphor 10 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 10, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 10.

<Phosphor 11>

Phosphor 11 is a phosphor represented by $(Ca_{0.49},Sr_{0.34},Eu_{0.17})_{7/6}SiO_3Cl_{2/6}$. Phosphor 11 is represented by the general formula $(M^2_x,M^3_y,M^4_z)_a M^1O_3X_b$, wherein $M^1$=Si, $M^2$=Ca, $M^3$=Sr, X=Cl, $M^4$=Eu$^{2+}$, a=7/6, and b=2/6. With regard to phosphor 11, raw materials were each weighed in molar ratios defined when Si shown in Table 1 was set to be 1.0, and the weighed raw materials were each placed in an alumina mortar and ground and mixed for about 30 minutes in a glove box in a nitrogen atmosphere so as to obtain a raw material mixture. The same method as the method used for phosphor 1 was then used to obtain phosphor 11.

<Phosphor 12>

Based on the result of XRD analysis, no crystal was found to be created in phosphor 12. Thus, phosphor 12 cannot be shown by a compositional formula. With regard to phosphor 12, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 12.

<Phosphor 13>

Based on the result of XRD analysis, no crystal was found to be created in phosphor 13. Thus, phosphor 13 cannot be shown by a compositional formula. With regard to phosphor 13, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 13.

<Phosphor 14>

Based on the result of XRD analysis, no crystal was found to be created in phosphor 14. Thus, phosphor 14 cannot be shown by a compositional formula. With regard to phosphor 14, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 14.

<Phosphor 15>

Based on the result of XRD analysis, no crystal was found to be created in phosphor 15. Thus, phosphor 15 cannot be shown by a compositional formula. With regard to phosphor 15, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 15.

<Phosphor 16>

Based on the result of XRD analysis, no crystal was found to be created in phosphor 16. Thus, phosphor 16 cannot be shown by a compositional formula. With regard to phosphor 16, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 16.

<Phosphor 17>

Based on the result of XRD analysis, no crystal was found to be created in phosphor 17. Thus, phosphor 17 cannot be shown by a compositional formula. With regard to phosphor 17, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 17.

<Phosphor 18>

Based on the result of XRD analysis, no crystal was found to be created in phosphor 18. Thus, phosphor 18 cannot be shown by a compositional formula. With regard to phosphor 18, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 18.

<Phosphor 19>

Based on the result of XRD analysis, no crystal was found to be created in phosphor 19. Thus, phosphor 19 cannot be shown by a compositional formula. With regard to phosphor 19, raw materials were each weighed in molar ratios defined when Si shown in Table 1 was set to be 1.0, and the weighed raw materials were each placed in an alumina mortar and ground and mixed for about 30 minutes in the atmosphere so as to obtain a raw material mixture. The same method as the method used for phosphor 1 was then used to obtain phosphor 19.

Subsequently, crystal X-ray diffraction measurement was performed on each phosphor, in which the host crystal described above was doped with Eu as an emission center element. First, powder X-ray diffraction measurement was performed by a powder X-ray diffractometer (RINT Ultima III, manufactured by Rigaku Corporation) using a Cu Kα characteristic X-ray (hereinafter referred to as measurement 2). The diffraction patterns observed in measurement 2 are shown in FIGS. 1 and 2.

Figure 2:
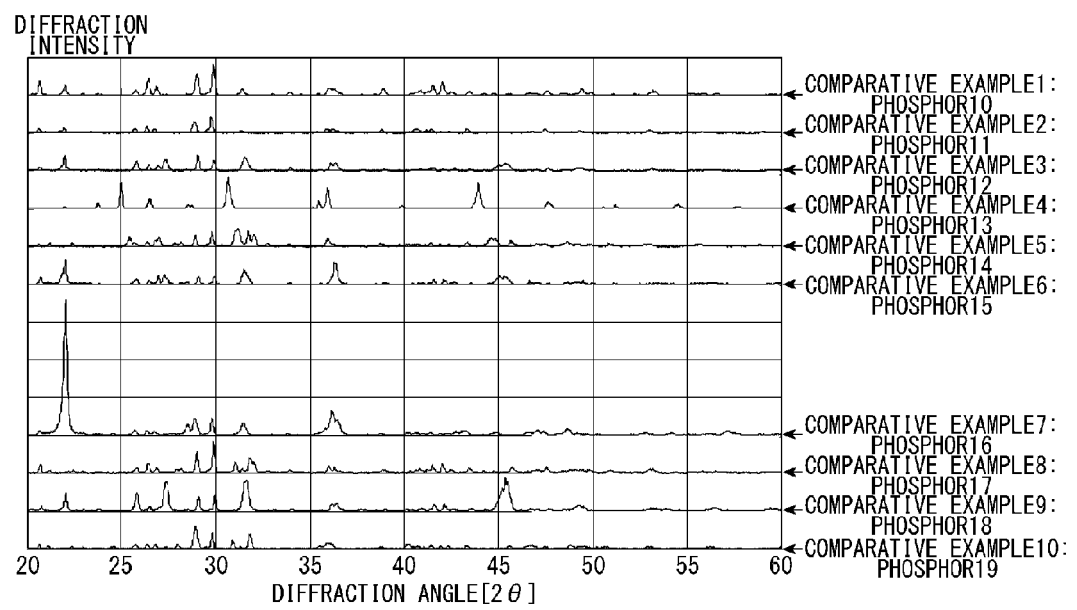
FIG. 2 is a diagram illustrating results of X-ray diffraction measurement using a Cu Kα characteristic X-ray with respect to phosphors 10 to 19 (comparative examples 1 to 10) according to the present comparative examples.

FIG. 1 is a diagram illustrating results of X-ray diffraction measurement using a Cu Kα characteristic X-ray with respect to phosphors 1 to 9 (exemplary embodiments 1 to 9) according to the present exemplary embodiments and a phosphor 10 (comparative example 1) according to the present comparative example. FIG. 2 is a diagram illustrating results of X-ray diffraction measurement using a Cu Kα characteristic X-ray with respect to phosphors 10 to 19 (comparative examples 1 to 10) according to the present comparative examples. Peaks near a diffraction angle (2θ) of 22 degrees shown in FIGS. 1 and 2 represent peaks of cristobalite included when silica is added excessively. As shown in FIG. 1, phosphors 1 to 9 and 10 exhibit X-ray diffraction patterns that are in very good agreement with one another, and phosphors 1 to 9 and 10 are therefore found to have the same crystal structure. Phosphors 10 and 11 are samples created using $SrCl_2$ in raw materials as a chlorine source. Phosphor 11 is a sample combined in a mortar in a glove box. As shown in FIG. 2, the diffraction patterns of phosphors 10 and 11 (comparative examples 1 and 2) are clearly different from the diffraction patterns of phosphors 12 to 19 (comparative examples 3 to 10).

The emission dominant wavelengths and the emission intensity ratios of phosphors 1 to 19 are shown in Table 2. The emission intensity ratio is shown by the ratio obtained when the emission intensity of phosphor 10 measured under the application of exciting light having a peak wavelength of 400 nm is set to be 100.

TABLE 2

| | EMISSION INTENSITY RATIO [%] | DOMINANT WAVELENGTH λd [nm] |
|---|---|---|
| EXEMPLARY EMBODIMENT 1: PHOSPHOR 1 | 120 | 577.0 |
| EXEMPLARY EMBODIMENT 2: PHOSPHOR 2 | 108 | 578.8 |
| EXEMPLARY EMBODIMENT 3: PHOSPHOR 3 | 103 | 572.3 |
| EXEMPLARY EMBODIMENT 4: PHOSPHOR 4 | 110 | 576.5 |
| EXEMPLARY EMBODIMENT 5: PHOSPHOR 5 | 108 | 577.7 |
| EXEMPLARY EMBODIMENT 6: PHOSPHOR 6 | 100 | 575.4 |
| EXEMPLARY EMBODIMENT 7: PHOSPHOR 7 | 112 | 575.9 |
| EXEMPLARY EMBODIMENT 8: PHOSPHOR 8 | 102 | 577.9 |
| EXEMPLARY EMBODIMENT 9: PHOSPHOR 9 | 103 | 579.1 |
| COMPARATIVE EXAMPLE 1: PHOSPHOR 10 | 100 | 577.4 |
| COMPARATIVE EXAMPLE 2: PHOSPHOR 11 | 112 | 578.2 |
| COMPARATIVE EXAMPLE 3: PHOSPHOR 12 | 29 | 579.2 |
| COMPARATIVE EXAMPLE 4: PHOSPHOR 13 | 0 | NON-LUMINOUS |
| COMPARATIVE EXAMPLE 5: PHOSPHOR 14 | 13 | 573.6 |
| COMPARATIVE EXAMPLE 6: PHOSPHOR 15 | 33 | 578.1 |
| COMPARATIVE EXAMPLE 7: PHOSPHOR 16 | 65 | 575.4 |
| COMPARATIVE EXAMPLE 8: PHOSPHOR 17 | 42 | 575.5 |
| COMPARATIVE EXAMPLE 9: PHOSPHOR 18 | 33 | 577.0 |
| COMPARATIVE EXAMPLE 10: PHOSPHOR 19 | 36 | 579.5 |

Figure 3:
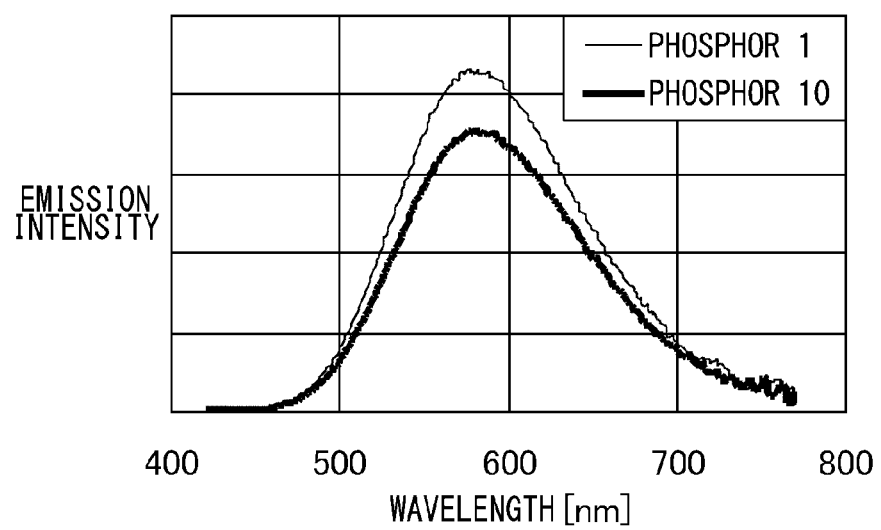
FIG. 3 is a diagram illustrating the emission spectra ($\lambda_{EX}$=400 nm) of the phosphors 1 and 10.
Figure 4:
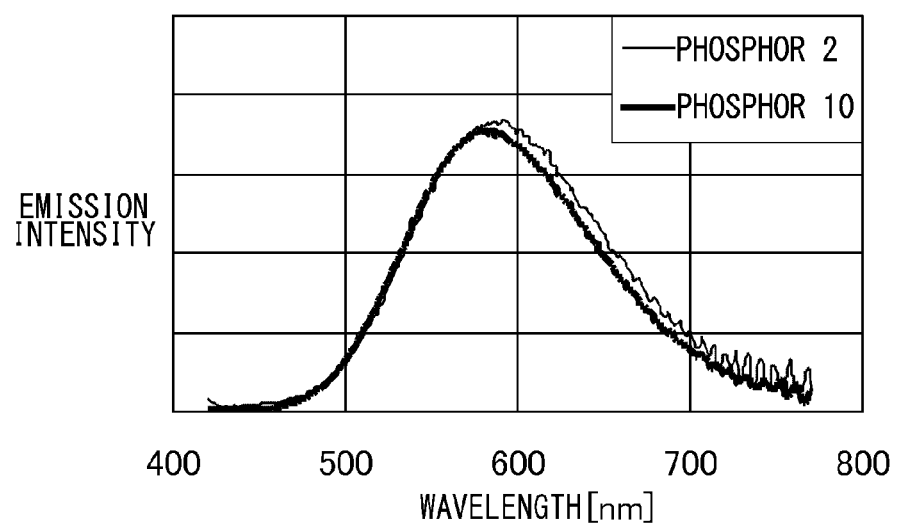
FIG. 4 is a diagram illustrating the emission spectra ($\lambda_{EX}$=400 nm) of the phosphors 2 and 10.
Figure 5:
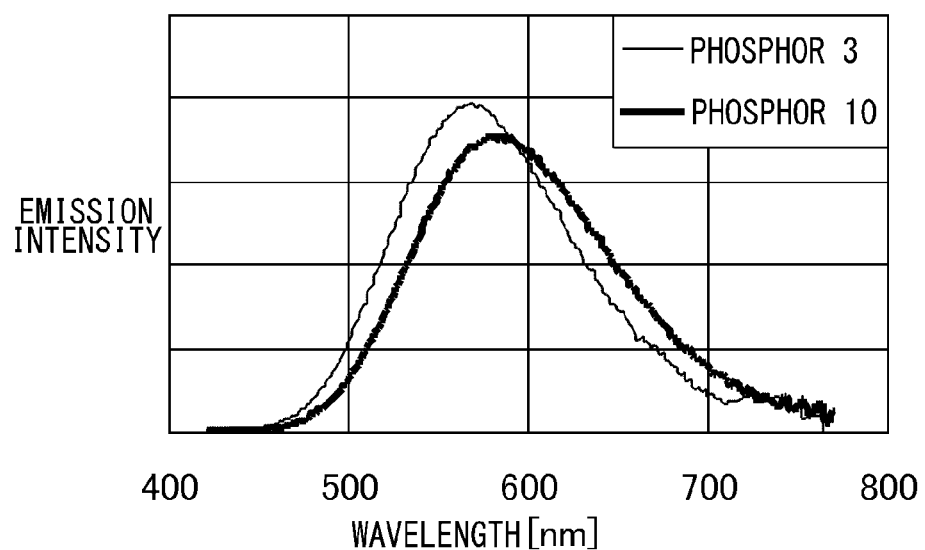
FIG. 5 is a diagram illustrating the emission spectra ($\lambda_{EX}$=400 nm) of the phosphors 3 and 10.
Figure 6:
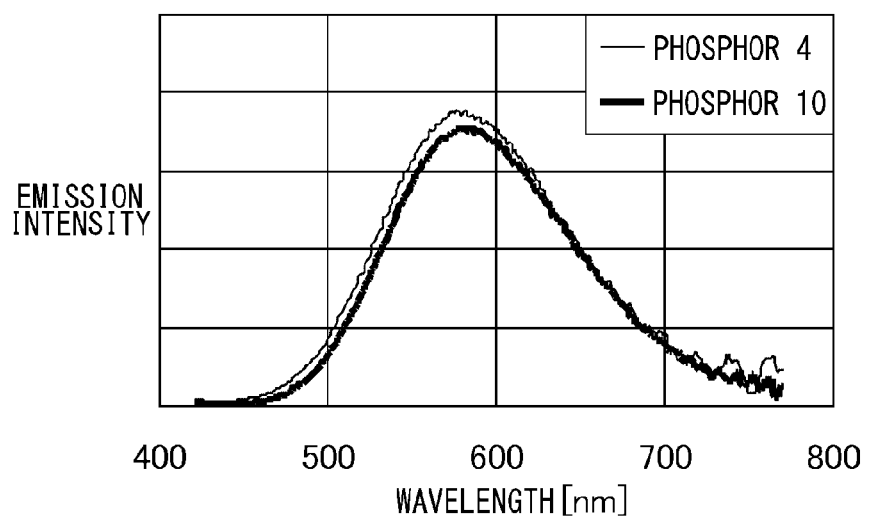
FIG. 6 is a diagram illustrating the emission spectra ($\lambda_{EX}$=400 nm) of the phosphors 4 and 10.
Figure 7:
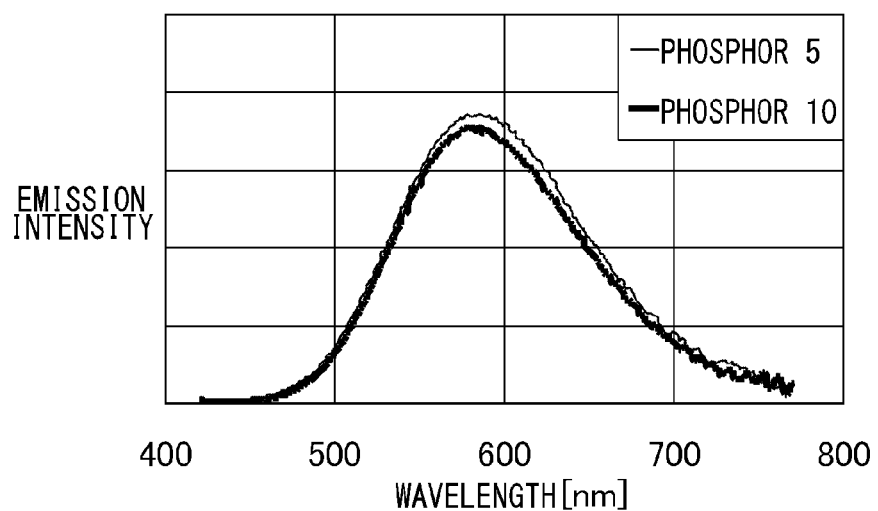
FIG. 7 is a diagram illustrating the emission spectra ($\lambda_{EX}$=400 nm) of the phosphors 5 and 10.
Figure 8:
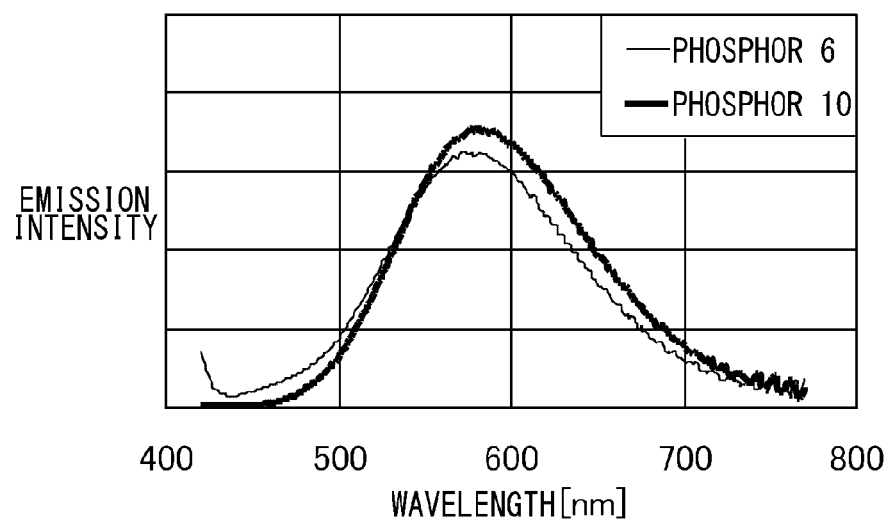
FIG. 8 is a diagram illustrating the emission spectra ($\lambda_{EX}$=400 nm) of the phosphors 6 and 10.
Figure 9:
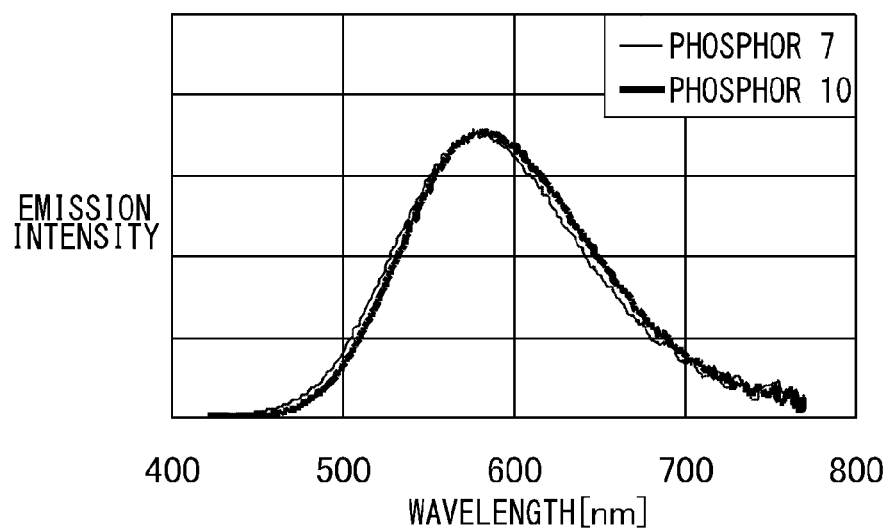
FIG. 9 is a diagram illustrating the emission spectra ($\lambda_{EX}$=400 nm) of the phosphors 7 and 10.
Figure 10:
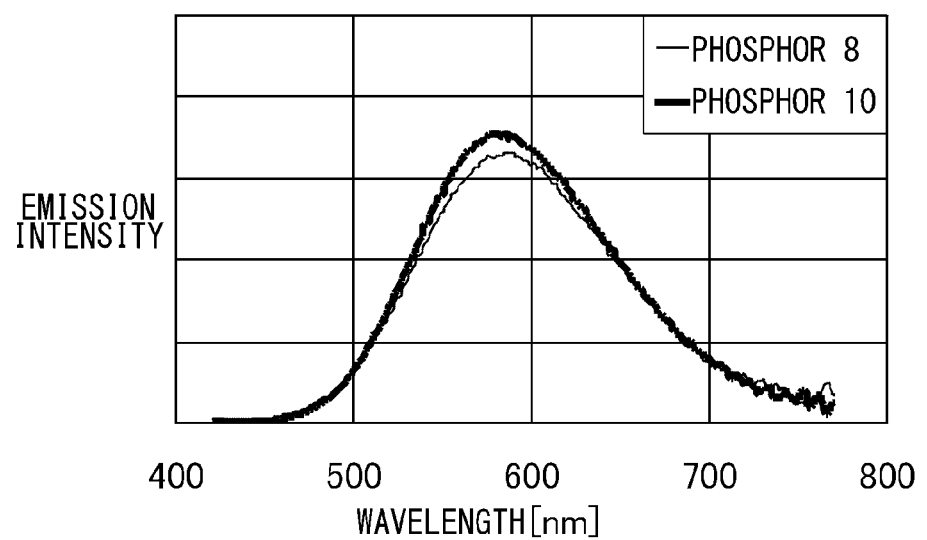
FIG. 10 is a diagram illustrating the emission spectra ($\lambda_{EX}$=400 nm) of the phosphors 8 and 10.
Figure 11:
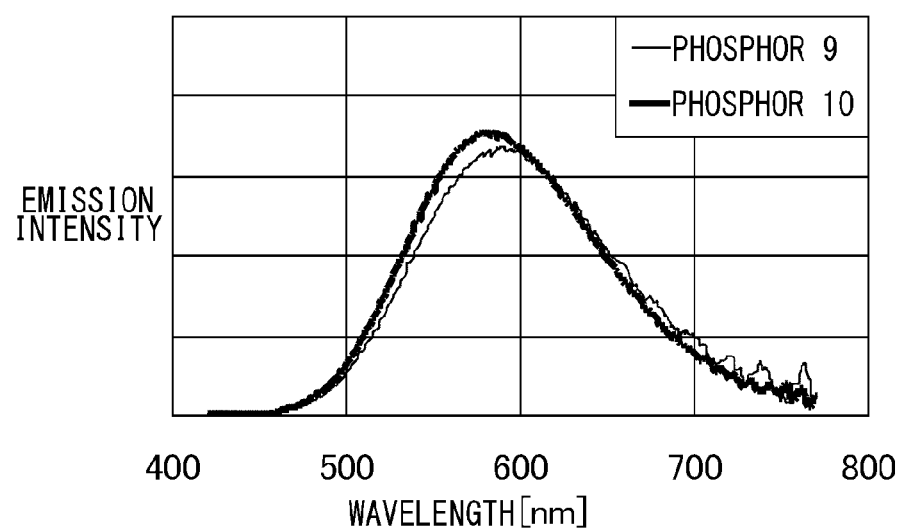
FIG. 11 is a diagram illustrating the emission spectra ($\lambda_{EX}$=400 nm) of the phosphors 9 and 10.

FIG. 3 is a diagram illustrating the emission spectra ($\lambda_{EX}$=400 nm) of the phosphors 1 and 10. FIG. 4 is a diagram illustrating the emission spectra ($\lambda_{EX}$=400 nm) of the phosphors 2 and 10. FIG. 5 is a diagram illustrating the emission spectra ($\lambda_{EX}$=400 nm) of the phosphors 3 and 10. FIG. 6 is a diagram illustrating the emission spectra ($\lambda_{EX}$=400 nm) of the phosphors 4 and 10. FIG. 7 is a diagram illustrating the emission spectra ($\lambda_{EX}$=400 nm) of the phosphors 5 and 10. FIG. 8 is a diagram illustrating the emission spectra ($\lambda_{EX}$=400 nm) of the phosphors 6 and 10. FIG. 9 is a diagram illustrating the emission spectra ($\lambda_{EX}$=400 nm) of the phosphors 7 and 10. FIG. 10 is a diagram illustrating the emission spectra ($\lambda_{EX}$=400 nm) of the phosphors 8 and 10. FIG. 11 is a diagram illustrating the emission spectra ($\lambda_{EX}$=400 nm) of the phosphors 9 and 10.

In the following, an A value through a D value are defined as follows The A value represents the molar ratio of $M^2O$ with respect to a metallic compound other than $M^1O_2(SiO_2)$ included in raw materials. In other words, A is represented as follows $A=M^2O/(M^2O+M^3O+M^4)$ The B value represents the molar ratio of $M^4(Eu^{2+})$ with respect to a metallic compound other than $M^1O_2(SiO_2)$ included in raw materials. In other words, B is represented as follows $B=M^4/(M^2O+M^3O+M^4)$ The C value represents the molar ratio of $NH_4X$ with respect to a metallic compound other than $M^1O_2(SiO_2)$ included in raw materials. In other words, C is represented as follows $C=NH_4X/(M^2O+M^3O+M^4)$ The D value represents the molar ratio of $M^1O_2$ with respect to a metallic compound other than $M^1O_2(SiO_2)$ included in raw materials. In other words, D is represented as follows $$D=M^1O_2/(M^2O+M^3O+M^4)$$

As shown in Table 2, phosphors 1 to 9 according to the exemplary embodiments are yellow light emitting phosphors with an emission dominant wavelength λd in a range of 572.3 to 579.1 nm. The respective emission intensity ratios of phosphors 1 to 9 according to the exemplary embodiments, which were prepared by mixing raw materials in the atmosphere using ammonium halide ($NH_4Cl$) as a starting material of halogen included in the phosphors, show high values of 100 to 120%. In the table, the emission intensity of phosphor 10, which was prepared by mixing raw materials in the atmosphere using $SrCl_2 \cdot 6H_2O$ as a starting material of halogen included in the phosphor, is 100%. The emission intensity of phosphor 11, for which the measurement and mixing of the raw materials in the preparation of phosphor 10 were performed inside a glove box in a nitrogen atmosphere, is 12% higher compared to that of phosphor 10 for which the measurement and the mixing were performed in the atmosphere, and the emission intensity ratio thereof is 112%. However, processes become complicated in the case of the preparation in a glove box, causing an increase in the manufacturing cost.

For this reason, it can be found that the atmosphere at the time of the mixing of raw materials is preferably a nitrogen atmosphere when $SrCl_2 \cdot 6H_2O$ is selected as a starting material of halogen. This is because $SrCl_2 \cdot 6H_2O$ is deliquescent, and deliquescence progresses in the atmosphere, which contains moisture. In particular, since the surface area is increased when the raw material of $SrCl_2 \cdot 6H_2O$ are ground and mixed at the time of preparing a phosphor, the progress of the deliquescence becomes prominent. In addition, when $SrCl_2 \cdot 6H_2O$ is used as a raw material, there is a possibility that a large amount of crystallization water volatilizes such that condensation occurs in an exhaust tube of a baking furnace, causing the exhaust tube to corrode.

Therefore, when $SrCl_2 \cdot 6H_2O$ is selected as a starting material of halogen, a device or a cleaning step for ensuring a nitrogen atmosphere is necessary, possibly causing the complication of a preparation step, a decrease in workability due to a task of mixing raw materials in a device, and corrosion of an exhaust tube of a baking furnace.

On the other hand, the deliquescency of a compound represented by a compositional formula $NH_4X$ (X is at least one element selected from a group consisting of F, Cl, Br, and I) is not generally high. Thus, if ammonium halide ($NH_4Cl$) is selected as a starting material of halogen, the mixing of raw materials can be also carried out in the atmosphere. Therefore, in the preparation of a phosphor, just like phosphors 1 to 9 represented by the general formula $(M^2_x, M^3_y, M^4_z)_a M^1 O_b$ that comprises a crystalline oxide having $M^1 O_3$ as a main framework thereof and essentially including a halogen element X and divalent metal ions $M^2$ and $Eu^{2+}$, a compound represented by a compositional formula $NH_4X$ is used as a feed material of a halogen element X contained in the phosphor. This allows the preparation of the phosphors in a wide range of environments even when the atmosphere at the time of mixing raw materials is not a nitrogen atmosphere. In other words, a phosphor having properties in a desired range can be easily prepared in a stable manner without using equipment or a step that takes into account the deliquescency, that is, humidity or can be easily prepared in a stable manner by simplifying the equipment or the step. Therefore, as in the case of phosphors 1 to 9, high emission intensity can be obtained even when preparation is carried out by mixing raw materials in the atmosphere.

As shown in Tables 3 and 4, in phosphors 1 to 9 according to the exemplary embodiments, the respective A values, the respective B values, the respective C values, and the respective D values are 0.19 to 0.59, 0.07 to 0.37, 0.29 to 1.11, and 0.65 to 4.35, respectively.

TABLE 3

|  | A VALUE = $M^2O/$ $(M^2O + M^3O + M^4)$ | B VALUE = $M^4/(M^2O + M^3O + M^4)$ |
|---|---|---|
| EXEMPLARY EMBODIMENT 1: PHOSPHOR 1 | 0.41 | 0.15 |
| EXEMPLARY EMBODIMENT 2: PHOSPHOR 2 | 0.59 | 0.15 |
| EXEMPLARY EMBODIMENT 3: PHOSPHOR 3 | 0.19 | 0.15 |
| EXEMPLARY EMBODIMENT 4: PHOSPHOR 4 | 0.41 | 0.15 |
| EXEMPLARY EMBODIMENT 5: PHOSPHOR 5 | 0.41 | 0.15 |
| EXEMPLARY EMBODIMENT 6: PHOSPHOR 6 | 0.30 | 0.17 |
| EXEMPLARY EMBODIMENT 7: PHOSPHOR 7 | 0.30 | 0.17 |
| EXEMPLARY EMBODIMENT 8: PHOSPHOR 8 | 0.56 | 0.07 |
| EXEMPLARY EMBODIMENT 9: PHOSPHOR 9 | 0.33 | 0.37 |
| COMPARATIVE EXAMPLE 1: PHOSPHOR 10 | 0.73 | 0.27 |
| COMPARATIVE EXAMPLE 2: PHOSPHOR 11 | 0.65 | 0.35 |
| COMPARATIVE EXAMPLE 3: PHOSPHOR 12 | 0.63 | 0.15 |
| COMPARATIVE EXAMPLE 4: PHOSPHOR 13 | 0.00 | 0.15 |
| COMPARATIVE EXAMPLE 5: PHOSPHOR 14 | 0.41 | 0.15 |
| COMPARATIVE EXAMPLE 6: PHOSPHOR 15 | 0.41 | 0.15 |
| COMPARATIVE EXAMPLE 7: PHOSPHOR 16 | 0.30 | 0.17 |
| COMPARATIVE EXAMPLE 8: PHOSPHOR 17 | 0.30 | 0.17 |
| COMPARATIVE EXAMPLE 9: PHOSPHOR 18 | 0.59 | 0.04 |
| COMPARATIVE EXAMPLE 10: PHOSPHOR 19 | 0.30 | 0.44 |

TABLE 4

|  | C VALUE = $NH_4X/$ $(M^2O + M^3O + M^4)$ | D VALUE = $M^1O_2/(M^2O + M^3O + M^4)$ |
|---|---|---|
| EXEMPLARY EMBODIMENT 1: PHOSPHOR 1 | 0.56 | 0.89 |
| EXEMPLARY EMBODIMENT 2: PHOSPHOR 2 | 0.56 | 1.41 |
| EXEMPLARY EMBODIMENT 3: PHOSPHOR 3 | 0.56 | 0.89 |
| EXEMPLARY EMBODIMENT 4: PHOSPHOR 4 | 0.29 | 0.89 |
| EXEMPLARY EMBODIMENT 5: PHOSPHOR 5 | 1.11 | 0.89 |
| EXEMPLARY EMBODIMENT 6: PHOSPHOR 6 | 0.65 | 4.35 |
| EXEMPLARY EMBODIMENT 7: PHOSPHOR 7 | 0.65 | 0.65 |
| EXEMPLARY EMBODIMENT 8: PHOSPHOR 8 | 0.56 | 0.96 |
| EXEMPLARY EMBODIMENT 9: PHOSPHOR 9 | 0.56 | 0.96 |
| COMPARATIVE EXAMPLE 1: PHOSPHOR 10 | 0.00 | 1.60 |
| COMPARATIVE EXAMPLE 2: PHOSPHOR 11 | 0.00 | 1.41 |
| COMPARATIVE EXAMPLE 3: PHOSPHOR 12 | 0.56 | 1.41 |

TABLE 4-continued

| | C VALUE = NH$_4$X/ (M$^2$O + M$^3$O + M$^4$) | D VALUE = M$^1$O$_2$/(M$^2$O + M$^3$O + M$^4$) |
|---|---|---|
| COMPARATIVE EXAMPLE 4: PHOSPHOR 13 | 0.56 | 0.89 |
| COMPARATIVE EXAMPLE 5: PHOSPHOR 14 | 0.19 | 0.89 |
| COMPARATIVE EXAMPLE 6: PHOSPHOR 15 | 1.30 | 0.89 |
| COMPARATIVE EXAMPLE 7: PHOSPHOR 16 | 0.65 | 6.52 |
| COMPARATIVE EXAMPLE 8: PHOSPHOR 17 | 0.65 | 0.57 |
| COMPARATIVE EXAMPLE 9: PHOSPHOR 18 | 0.56 | 0.96 |
| COMPARATIVE EXAMPLE 10: PHOSPHOR 19 | 0.56 | 0.96 |

Described above is an explanation of the present invention based on the embodiments and the exemplary embodiments. These embodiments are intended to be illustrative only, and it will be obvious to those skilled in the art that various modifications to constituting elements and processes could be developed and that such modifications are also within the scope of the present invention.

A phosphor (fluorescent substance) according to the present invention can be used in combination with an LED of a variety of lighting devices, e.g., lightning fixtures, displays, vehicle lights, signals, etc.

The invention claimed is:

1. A method for preparing a phosphor,
wherein the general formula of the phosphor is represented by $(M^2_x, M^3_y, M^4_z)_a M^1 O_3 X_b$, where a is in a range of $0.8 \leq a \leq 1.3$, where b is in a range of $0.25 \leq b \leq 0.45$, and where x, y, and z are in respective ranges that satisfy $x+y+z=1$, $0.18 \leq x \leq 0.59$, $0.26 \leq y \leq 0.66$, and $0.07 \leq z \leq 0.37$, and wherein compounds represented by a compositional formulae (1) to (5), respectively, are used as starting materials:

(1) $M^1 O_2$
(2) $M^2 O$
(3) $M^3 O$
(4) $NH_4 X$
(5) $M^4$ or a compound including $M^4$, where $M^1$ represents at least one element selected from the group consisting of Si, Ge, Ti, Zr, and Sn, where $M^2$ represents Ca and optionally includes at least one element selected from the group consisting of Mg, Ba, Zn, Cd, Ni, Cu, Hg, Co, and Sn, where $M^3$ represents Sr and optionally includes at least one element selected from the group consisting of Ba, and Pb, where X represents at least one halogen element including at least Cl, where $M^4$ represents $Eu^{2+}$ and optionally includes at least one element selected from the group consisting of rare-earth elements and Mn, and wherein, when $A=M^2O/(M^2O+M^3O+M^4)$, $B=M^4/(M^2O+M^3O+M^4)$, $C=NH_4X/(M^2O+M^3O+M^4)$, and $D=M^1O_2/(M^2O+M^3O+M^4)$, the compounds are blended such that ranges $0.19 \leq A \leq 0.59$, $0.07 \leq B \leq 0.37$, $0.29 \leq C \leq 1.11$, and $0.05 \leq D \leq 4.35$ are satisfied, and wherein the method comprises mixing and burning of the starting materials.

* * * * *